United States Patent [19]
Newman et al.

[11] Patent Number: 5,856,040
[45] Date of Patent: Jan. 5, 1999

[54] ALKALINE CELL

[75] Inventors: Gerald H. Newman, Weymouth; Alwyn H. Taylor, Wellesley Hills, both of Mass.; Michel Vernhes, Westport, Conn.

[73] Assignee: Duracell, Inc., Bethel, Conn.

[21] Appl. No.: 673,045

[22] Filed: Mar. 21, 1991

[51] Int. Cl.$^6$ .............................. H01M 6/04; H01M 2/00
[52] U.S. Cl. .................. 429/165; 429/224; 429/229; 429/94
[58] Field of Search .................. 429/206, 165, 429/224, 229, 241, 245, 94

[56] References Cited

U.S. PATENT DOCUMENTS

| | | | |
|---|---|---|---|
| 3,219,487 | 11/1965 | Krouse et al. | 429/165 |
| 3,510,358 | 5/1970 | Nabiullin et al. | 429/165 |
| 4,091,178 | 5/1978 | Kordesch | 429/230 X |
| 4,175,052 | 11/1979 | Norteman, Jr. | 429/229 X |
| 4,384,029 | 5/1983 | Kordesch et al. | 429/224 X |
| 4,777,100 | 10/1988 | Chalilpoyil et al. | 429/224 X |
| 4,992,343 | 2/1991 | Nardi | 429/224 X |
| 5,034,291 | 7/1991 | Jacus | 429/206 |
| 5,164,274 | 11/1992 | Kordesch et al. | 429/224 X |

*Primary Examiner*—Anthony Skapars
*Attorney, Agent, or Firm*—Ronald S. Cornell; Barry D. Josephs

[57] ABSTRACT

An improved high rate alkaline cell is obtained by employing an anode current collector comprising a foraminous metal.

5 Claims, 3 Drawing Sheets

ALKALINE CELL

The present invention relates to a high power primary alkaline cell having a powdered zinc anode. The cell comprises an improved anode current collector made from a foraminous metal. Such a collector permits power to be drawn from such cells which can not otherwise be drawn when conventional collectors are used.

Alkaline zinc/manganese dioxide cells have been commercially available for over twenty years. Generally, these cells have a "bobbin design" wherein the manganese dioxide cathode is annularly shaped and has its outer wall in contact with the inner wall of the cell casing. The central cavity of the annulus is lined with an appropriate separator material, and a gelled mixture of the powdered zinc anode and an aqueous electrolyte is contained within the separator lined cavity. The open end of the cell casing is sealed by a circular closure member, and a nail shaped anode collector passes through said closure member into the zinc anode.

A nail-shaped anode collector works well for many applications. This is evidenced by the fact that since alkaline cells became available over twenty years ago a nail-type collector has been used by most battery manufacturers (one manufacturer has used a flat metal sheet bent into a semi-circle in "C" and "D" size cells). However, it has been discovered that replacing a nail-type collector with a foraminous metal collector increases the energy available at high power drains, e.g. in excess of 1 watt, up to ten times as much, in some applications, as is available using a nail. Examples of foraminous metals includes, but is not limited to metal foam, metal felt, expanded metal, woven metal, and knitted metal mesh. Such an increase in the power capability of a primary alkaline cell not only improves the usefulness of such cells in present applications but also opens up new applications which could not be satisfied by presently available alkaline cells.

Anode collectors of the present invention can be made with about the same metal content as presently used nails so that the actual volume taken up inside the anode is no greater than a nail. In fact, anode collectors of the present invention can be made which take up less actual volume than nail-type collectors so that more zinc can be added to the anode. The distribution of the foraminous metal is throughout a greater volume of the anode than a nail. Thus, the collectors of the present invention can extend throughout substantially the entire anode volume while only taking up the same actual volume as a nail.

Some of the aforementioned foraminous metals have been used as electrode substrates in secondary (i.e. rechargeable) batteries, such use being disclosed in U.S. Pat. Nos. 3,549,423, 3,287,166, and 4,217,939. They have also found use as substrates in primary lithium batteries. For example, a commercially available lithium/manganese dioxide cell has an expanded metal grid made from stainless steel as the substrate for the cathode. In all of these applications the electrodes are spirally wound together and the metal substrate is needed in order to provide an electrode structure made from a powdered active material which can be easily handled.

A primary zinc/manganese dioxide cell does not have the zinc particles fixed to a substrate. Rather, the electrolyte and the anode particles are dispensed into the anode cavity and a current collector is inserted thereafter. This process works best if the zinc/electrolyte mixture has some fluid-like properties. Once the zinc is dispensed into the cell it is desirable to keep the particles from settling due to gravity since this would shorten the height of the anode and detrimentally effect cell performance. Therefore, the zinc anode is often in the form of a gel or suspension containing the individual zinc particles and a gellant material. Electrical continuity throughout the anode depends on the particle to particle contact between the individual particles. Electrical continuity is also enhanced in presently available alkaline cells by the presence of mercury which is added to the anode for the reasons described immediately below.

Zinc has a tendency to react with the aqueous electrolyte and form hydrogen gas. Gas build-up within a cell is undesirable for obvious reasons. One solution to this problem is to amalgamate the zinc with mercury. Amalgamated zinc has a lesser tendency to react with water than pure zinc whereby hydrogen gas generation is controlled at acceptable levels. However, due to the environmental concerns over used alkaline cells being disposed of in land fills, there has been a recent trend toward reducing the amount of mercury or eliminating it altogether. The reduction or elimination of mercury is not without its problems. Reduction of the mercury content to 0.5% or less, by weight, of the anode results in an increased shock sensitivity of the voltage of an alkaline cell during discharge. Attempts have been made to overcome the shock sensitivity problem described above. U.S. Pat. Nos. 4,939,048 and 4,942,101 disclose the use of anode collectors which are modified versions of the nail-type collector described above.

The present invention cures the voltage instability problem associated with low mercury levels described above in addition to increasing the energy available at high power drains. In fact, it has been discovered that eliminating mercury from the anode in cells made in accordance with the present invention improves the power capability under high rate discharge. Accordingly, in a preferred embodiment of the present invention the zinc anode contains no mercury whatsoever. Such embodiment preferably also includes a gas inhibitor such as those disclosed in U.S. Pat. No. 4,195,120 or any of the other well known inhibitors.

The features and advantages of the present invention are discussed below with reference to the Figures in which.

Figure 1:
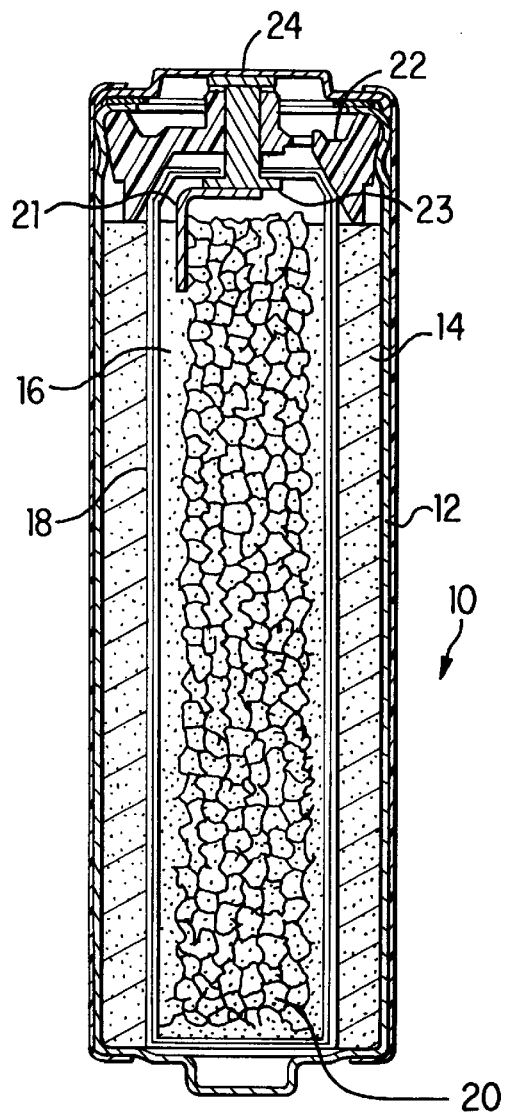
FIG. 1 is a cross-sectional view through an alkaline cell having an anode collector in accordance with the present invention.

Referring now to the Figures, cell 10 comprises cylindrical casing 12 having cathode 14 disposed therein and contacting the inner wall of said casing. Cathode 14 is a porous, annularly shaped structure comprising manganese dioxide and graphite, which structure is permeated by electrolyte. The central cavity of cathode 14 is lined with an appropriate separator material and a gelled zinc anode 16 comprising discrete zinc particles fills the separator lined cavity. In accordance with the present invention anode collector 20 is made from a foraminous metal. A metal tab 21 has one end welded to collector 20 and the other end welded to rivet 23. Rivet 23 passes through closure member 22 and contacts metal cover 24 whereby electrical connection of the anode to the outside negative contact 24 is achieved.

It is preferred that anode collector 20 is made from a metal foam material, such as that made by the process disclosed in U.S. Pat. No. 4,882,22. The metal foams are preferably at least 80% porous, more preferably at least 90% porous, and most preferably at least 95% porous. The size of the pores will desirably range from about 0.01 inch to about 0.1 inch.

In a preferred embodiment the cylindrically shaped foam anode collector has a diameter of at least about 50% of the diameter of the zinc anode and a length corresponding to a major portion of the axial length of the cavity. The collectors are generally prepared from a flat foam sheet. This is readily achieved for "AA" size cells, which have an anode diameter of about 0.35 inch, by forming the foam cylinders from a sheet about 0.3 inch thick. However, for larger cells such as "D" cells, which have an anode diameter of about 0.9 inch, an anode collector such as the one shown in FIG. 2A can be used. The reason for this is that foam metal sheets having a thickness of about 0.9 inch are not readily available. Therefore, by taking a thinner foam sheet and folding, coiling, or otherwise shaping it into a more or less cylindrical shape, the desired current collector is obtained.

Figure 2B:
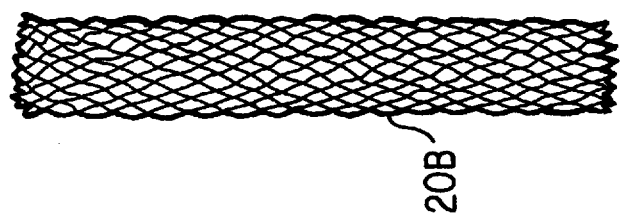
FIG. 2b shows an embodiment of a current collector made from expanded metal.
Figure 2A:
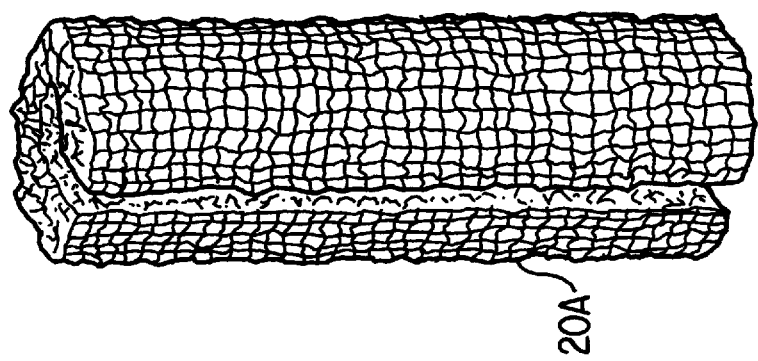
FIG. 2a shows another embodiment of an anode collector made from metal foam.
Figure 2:
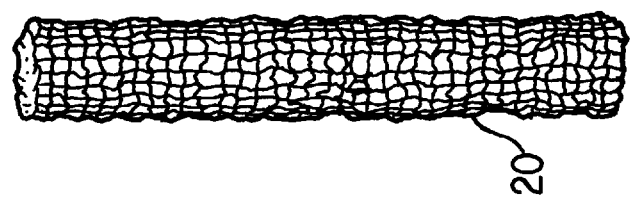
FIG. 2 shows one embodiment of an anode collector in accordance with the present invention made from metal foam.

Another embodiment of the anode collector is shown in FIG. 2B. Anode collector 20B is formed by taking a rectangularly shaped piece of expanded metal and coiling it to form a cylinder. The expanded metal can be loosely coiled so that there are small gaps within the cylindrical structure. This embodiment imparts similar high rate capability to a cell as obtained by a cylinder of foam.

The foraminous metal is preferably made from a material which is stable in the cell environment. Preferred materials include, but are not limited to, copper, silicon bronze, brass, tin, indium, lead, and alloys of these. Alternatively, the foraminous metal could be made of any metal which has a surface plating of one of the above preferred metals. Further, any of the well known coatings for anode conductors which inhibit gassing in alkaline cells can also be used on the collectors of the present invention.

The actual volume occupied by an anode collector of the present invention preferably will not be greater than the volume of the collectors which are presently being used. The volume percent of the anode cavity which a collector occupies in commercially available alkaline cells is generally less than about 1.5%. For cells intended to be used only in high power applications the actual volume of the collector could be increased to as high as 5% of the anode volume without detrimentally effecting the cell performance since at high power drains all of the zinc is not utilized.

The "apparent volume" of anode collectors made in accordance with the present invention will exceed the actual volume. As used herein, the term "apparent volume" means the volume of the shape which follows the contours of the outermost surfaces of the collector, from which large openings or gaps, such as those which would result from forming the collector from a metal network which originally is in a different shape, such as a flat sheet, are subtracted. In determining the apparent volume the pores or interstices of the metal network are ignored.

The maximum apparent volume for the collector is about 100% of the anode volume. However, the apparent volume will be less than this if the collector is to be inserted into the cavity after it is filled with the powdered zinc anode; otherwise, the collector could not easily be inserted without interfering with the separator. An anode collector of the present invention is a cylinder made from a foraminous metal which contains about the same amount of metal as a typical nail-type collector (only that part of the nail which penetrates into the anode) but which has an apparent volume of the portion contained within the anode which is no greater than the anode volume. A collector will necessarily have a high degree of porosity in order to have no more metal than a nail and also have a high apparent volume. An indicator of the porosity is the ratio of the apparent volume of the collector, $V_{app}$, to the actual volume of metal in the collector, $V_{act}$. A non-porous metal collector, such as a nail, would have a ratio of $V_{app}/V_{act}$ equal to 1 since the apparent volume would equal the actual volume. However, a foraminous metal will always have a ratio of $V_{app}/V_{act}$ greater than 1. For example, a collector made of metal foam in the shape of a cylinder the size of a zinc anode for a AA cell and having the same metal content as a presently used nail has a ratio of $V_{app}/V_{act}$ of about 60. On the other hand, a piece of expanded metal made from a thin sheet stock and having small openings could have a ratio of $V_{app}/V_{act}$ as low as 5, and still be useful in accordance with the invention. It is preferred that the ratio is at least about 10, and in a most preferred embodiment, especially where high drain rates are desired, the ratio should be in excess of 20.

Figure 3:
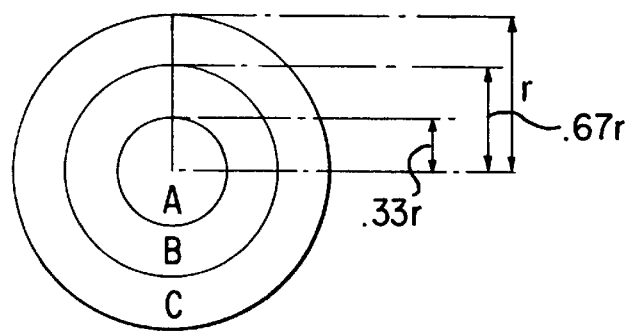
FIG. 3 shows a cross-sectional view of a zinc anode.

It has been discovered that the distribution of the metal content of the anode collector throughout the apparent volume plays a major role in the high power capability of alkaline cells. A cylindrical zinc anode can be divided into three imaginary zones as shown in FIG. 3, which figure shows a cross section through a zinc anode. Zone "A" has a radius of 0.33 r (r=the radius of the zinc anode), zone "B" includes zone "A" and has a radius of 0.67 r, and zone "C" includes both zones "A" and "B" and has a radius equal to r. Regardless of the actual values of r and the height of the anode, zone A occupies about 11% of the anode volume, zone B about 45% of the anode volume, and zone C about 100% of the anode volume. Nail-type collectors reside wholly within zone A. The collectors of the present invention preferably extend at least to the outer portion of zone "B" and, more preferably, extend beyond said outer portion. It is believed that extending the metal of the collector outwardly beyond zone "B" improves the collection of electrons from the zinc in this region during discharge which in turn allows greater power to be drawn from the cell.

The features and advantages of the present invention are demonstrated in the following examples.

COMPARATIVE EXAMPLE A (PRIOR ART)

Thirty two "AA" size zinc/manganese dioxide cells are built having a brass nail as the anode collector. The anode volume in each cell is about 0.16 in$^3$. The nail occupies about 1.5% of the volume of the anode cavity. A gelled zinc anode is used without any mercury present but contains 50 ppm of a phosphate ester gas inhibitor (RA600, GAF Corp.) and the zinc particles contain 250 ppm indium.

Figure 4:
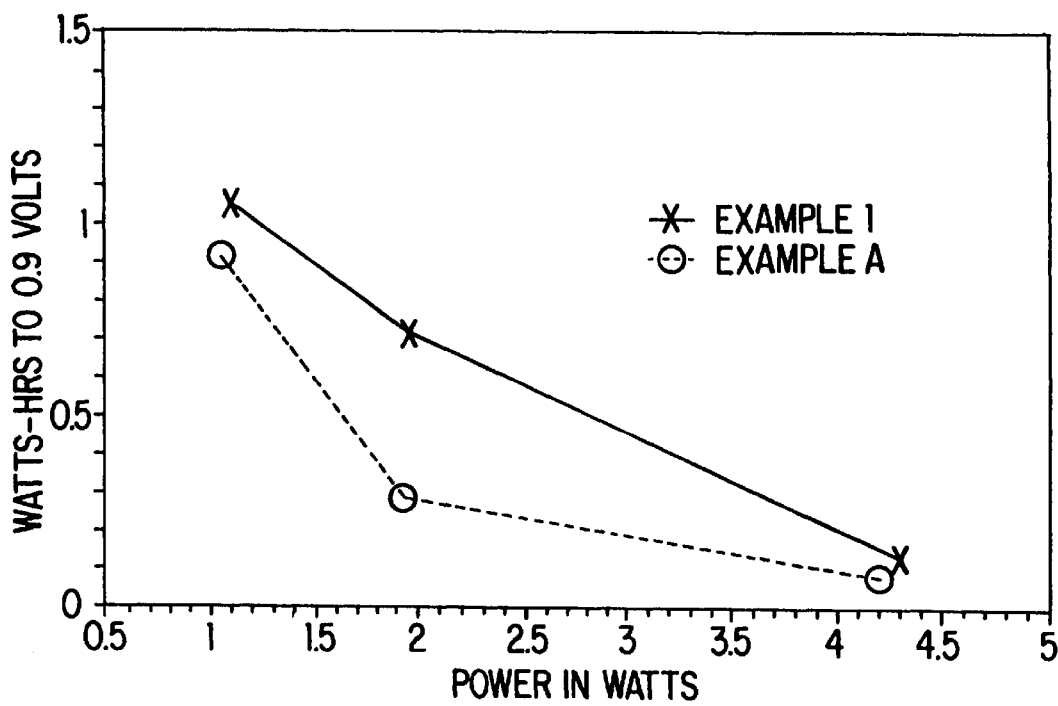
FIG. 4 is a graph of the energy obtained versus power drain for "AA" size cells made in accordance with the present invention.

The cells are divided into four groups of 8. The cells of one group are each discharged at 3.9 ohms, the cells of the second group are each discharged at 1 ohm, the cells of the third group are each discharged at 0.5 ohm and the cells of the fourth group are each discharged at 0.25 ohm. With a cut-off voltage of 0.9 volts the power obtained from each cell at the 3.9 ohms discharge is about 0.5 watt, the power obtained from each cell at the 1 ohm discharge is about 1 watt, the power obtained from each at the 0.5 ohm discharge is about 2 watts and the power obtained from each cell at the 0.25 ohm discharge is about 4 watts. The average watt-hours obtained from each group of cells is shown in FIG. 4 plotted against the power drains given above.

EXAMPLE 1

Thirty two "AA" size zinc/manganese dioxide cells are built identical to those of the previous example except that an anode collector in accordance with the present invention is used. Each cell has an anode collector comprising a cylinder of copper foam. The foam has about 20 pores per inch and the cylinder is about 0.25 inch in diameter and 1.6 inch long. Thus, the apparent volume is about 50% of the anode volume. The cylinder weighs about 0.25 grams and has an actual volume which is about 1% of the anode volume. The ratio of the apparent volume to the actual volume is about 50. Electrical connection to the foam cylinder is achieved by a nail which penetrates through the cell cover and contacts the upper portion of the foam.

The cells are divided into four groups of eight. These groups are discharged as described above. The average watt-hours obtained from each group is shown in FIG. 4 plotted against the power drain. At the 0.5 watt drain the cells of the present invention deliver 1.1 times the energy of the prior art cells, at the 1 watt drain they deliver 1.2 times the energy of the prior art cells; at the 2 watt drain they deliver 2.3 times the energy of prior art cells, and at the 4 watt drain they deliver 2 times the energy of prior art cells.

COMPARATIVE EXAMPLE B (PRIOR ART)

Eighteen "D" size zinc/manganese dioxide cells are built having a brass nail as the anode collector. The nail occupies about 0.6% of the volume of the anode cavity. A gelled zinc anode is used without any mercury present but contains 50 ppm of a phosphate ester gas inhibitor (RA600) and the zinc particles contain 250 ppm indium.

Figure 5:
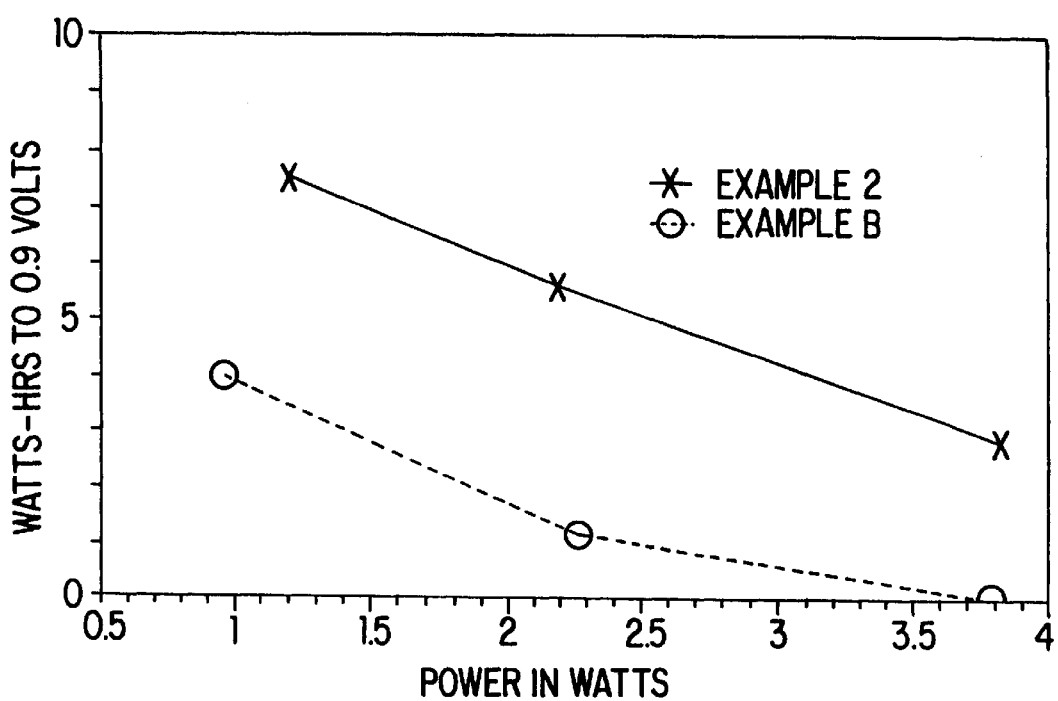
FIG. 5 is a graph of the energy obtained versus power drain for "D" size cells made in accordance with the present invention.

The cells are divided into three groups of six. The cells of one group are each discharged at 1 ohm, the cells of the second group are each discharged at 0.5 ohm and the cells of the third group are each discharged at 0.25 ohms. The power delivered by each cell under these loads is about the same as described in the previous two examples. The average watt-hours obtained to a 0.9 volt cut-off from each group of cells is shown in FIG. 5 plotted against the power drain.

EXAMPLE 2

Eighteen "D" size zinc/manganese dioxide cells are built identical to the previous example except that an anode collector in accordance with the present invention is used. Each cell has an anode collector comprising a piece of copper expanded metal formed into a cylinder. The expanded metal used to form the cylinder is 1.6 inches wide and 5.5 inches long with a thickness of 0.012 inch (Delker Corp., #5Cu 7-125) giving an apparent volume which is about 11% of the anode volume. The expanded metal is loosely coiled into a cylindrical shape having a diameter of about 0.6 inch and a height of 1.6 inches so that the collector extends into the outer portion of zone "B" (see FIG. 3). The actual volume of each cylinder is about 1% of the volume of the anode so that $V_{app}/V_{act}$ is about 11. A copper tab is welded to one end of each cylinder. Attachment to the cover is achieved by welding the other end of the tab to a rivet located in the center of the cell cover.

The cells are divided into three groups of six. These groups are discharged as described above. The average watt-hours obtained from each group is shown in FIG. 5 plotted against the power drain. At the 1 watt drain the cells of the present invention deliver about 2 times the energy of the prior art cells; at the 2 watt drain they deliver over 3 times the energy of prior art cells, and at the 4 watt drain they deliver over 10 times the energy of prior art cells.

These examples clearly demonstrate the high power capability of alkaline cells having anode collectors in accordance with the present invention. Cells made in accordance with Examples 1 and 2 do not exhibit any voltage instability problem when subjected to shock or vibration. While the above examples are for mercury-free cells, similar results are obtained when mercury is included in the anode. In fact, quite unexpectedly, cells made in accordance with the present invention without mercury present perform better than when mercury is present. Mercury-free cells preferably include gassing inhibitors. While the examples included a phosphate ester and indium, other organic and inorganic inhibitors which are well known in the art can be used.

Alkaline cells having an anode collector in accordance with the present invention deliver significantly more energy at high power drains without increasing the amount of active materials. The improved high power capability allows cells made in accordance with the present invention to be used for powering cellular telephones, lap top computers, camcorders, and other devices which previously could not use primary alkaline cells.

It is to be understood that the above examples are for illustrative purposes only. Variations to the specific embodiments described in the examples can be made and remain within the scope of the invention as claimed.

What is claimed is:

1. A primary alkaline cell comprising a casing, an annularly shaped cathode structure comprising manganese dioxide in electrical contact with the inner casing wall; a separator lining the annular cavity of the cathode; an anode comprising discrete zinc particles substantially filling the separator lined cavity; an alkaline electrolyte permeating said cathode, separator, and anode; and an anode current collector comprising a foraminous metal wherein said collector provides electrical continuity along substantially the entire axial portion of the cavity which contains the anode from a locus at or near the center axis of the cavity to a locus near the periphery of the cavity.

2. A primary alkaline cell comprising a casing, an annularly shaped cathode structure comprising manganese dioxide in electrical contact with the inner casing wall; a separator lining the annular cavity of the cathode; an anode comprising discrete zinc particles substantially filling the separator lined cavity; and an alkaline electrolyte permeating said cathode, separator and anode; and an anode collector comprising a foraminous metal cylinder of a size and shape which fits within the anode and wherein said foraminous metal is uniformly distributed from the central axial portion of the cylinder outwardly to the cylinder outer wall, said cylinder having an apparent volume of at least 50% of the anode volume.

3. The primary alkaline cell of claim 2 wherein said anode is substantially free from mercury.

4. The primary alkaline cell of claim 2 wherein said collector extends along a substantial length of said cavity.

5. The primary alkaline cell of claim 4 wherein the anode is substantially free from mercury.

* * * * *